US008705576B2

(12) United States Patent
Shim et al.

(10) Patent No.: US 8,705,576 B2
(45) Date of Patent: Apr. 22, 2014

(54) METHOD AND APPARATUS FOR DEBLOCKING-FILTERING VIDEO DATA

(75) Inventors: Woo-sung Shim, Yongin-si (KR); Hak-sup Song, Suwon-si (KR); Young-ho Moon, Suwon-si (KR); Jong-bum Choi, Yangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1453 days.

(21) Appl. No.: 12/013,021

(22) Filed: Jan. 11, 2008

(65) Prior Publication Data

US 2008/0170629 A1 Jul. 17, 2008

Related U.S. Application Data

(60) Provisional application No. 60/884,468, filed on Jan. 11, 2007, provisional application No. 60/885,140, filed on Jan. 16, 2007.

(30) Foreign Application Priority Data

May 4, 2007 (KR) .................. 10-2007-0043794

(51) Int. Cl.
*H04J 1/02* (2006.01)
*H04N 7/26* (2006.01)

(52) U.S. Cl.
CPC ................ *H04N 7/26425* (2013.01)
USPC .................... 370/497; 375/240.21

(58) Field of Classification Search
USPC .............. 375/240.01–240.29; 370/532–546
See application file for complete search history.

(56) References Cited

U.S. PATENT DOCUMENTS

| | | | |
|---|---|---|---|
| 6,859,499 B2 | 2/2005 | Hashimoto | |
| 7,031,392 B2 | 4/2006 | Kim et al. | |
| 7,535,961 B2 * | 5/2009 | Cho et al. | 375/240.12 |
| 7,630,443 B2 * | 12/2009 | Sato | 375/240.29 |
| 2003/0053711 A1 * | 3/2003 | Kim | 382/268 |
| 2003/0206587 A1 | 11/2003 | Gomila | |
| 2003/0206664 A1 * | 11/2003 | Gomila et al. | 382/268 |
| 2004/0062310 A1 * | 4/2004 | Xue et al. | 375/240.16 |
| 2004/0179620 A1 * | 9/2004 | Foo et al. | 375/240.27 |
| 2005/0013363 A1 * | 1/2005 | Cho et al. | 375/240.12 |
| 2005/0243911 A1 * | 11/2005 | Kwon et al. | 375/240.03 |
| 2005/0276505 A1 * | 12/2005 | Raveendran | 382/268 |
| 2006/0067409 A1 | 3/2006 | Onoda et al. | |
| 2007/0177671 A1 * | 8/2007 | Yang | 375/240.25 |
| 2009/0028249 A1 * | 1/2009 | Gomila et al. | 375/240.29 |
| 2009/0257669 A1 * | 10/2009 | Kim et al. | 382/238 |
| 2010/0183068 A1 * | 7/2010 | Pandit et al. | 375/240.02 |

OTHER PUBLICATIONS

Pandit et al.,"Method and Apparatus for Reduction of Coding Artifacts for Illumination Compensation in Multi-View Coded Video", Jan. 4, 2007, U.S. Appl. No. 60/883,466.*
Communication dated Nov. 28, 2013, issued by the Korean Intellectual Property Office in counterpart Korean Application No. 10-2007-0043794.

* cited by examiner

*Primary Examiner* — Kwang B Yao
*Assistant Examiner* — Juvena Loo
(74) *Attorney, Agent, or Firm* — Sughrue Mion, PLLC (57) ABSTRACT

Provided are a method and an apparatus for filtering video data. The method includes determining whether a difference value of illumination change (DVIC) of a current image processing unit containing a current block is different from a DVIC of an image processing unit that is adjacent to the current image processing unit and based on the determining, adjusting a filtering strength of a deblocking filter and performing deblocking filtering on a boundary of the current block using the filter with the adjusted filtering strength.

19 Claims, 10 Drawing Sheets

```
slice_header( ) {
    first_mb_in_slice
    slice_type
    ic_enable
    pic_parameter_set_id
    frame_num
    . . .

if (deblocking_filter_control_present_flag) {
        disable_deblocking_filter_idc
        if(disable_deblocking_filter_idc !=1) {
            slice_alpha_c0_offset_div2
            slice_beta_offset_div2
            slice_ic_th1_mvc
            slice_ic_th2_mvc
        }
    }
}
```

FIG. 9

METHOD AND APPARATUS FOR DEBLOCKING-FILTERING VIDEO DATA

CROSS-REFERENCE TO RELATED PATENT APPLICATION

This application claims priority from Korean Patent Application No. 10-2007-0043794, filed on May 4, 2007, in the Korean Intellectual Property Office, priority from U.S. provisional Patent Application No. 60/884,468, filed on Jan. 11, 2007, and U.S. Provisional Patent Application No. 60/885,140, filed on Jan. 16, 2007, in the U.S. Patent and Trademark Office, the disclosures of which are incorporated herein their entirety by reference.

BACKGROUND OF THE INVENTION

1. Field of the Invention

The present invention relates to a method and apparatus for filtering video data, and more particularly, to a method and apparatus for deblocking-filtering video data containing a block encoded with illumination compensation.

2. Description of the Related Art

In video compression standards such as moving picture expert group (MPEG)-1, MPEG-2, MPEG-4, H.264/MPEG-4 AVC (Advanced Video Coding) standards, a picture is divided into the units of image processing, i.e., macroblocks, for video encoding. Each of the macroblocks is then encoded using interprediction or intraprediction.

These video compression methods perform decoding after performing compression encoding in units of macroblocks, resulting in blocking artifacts in the reconstructed video data. Discrete cosine transformation (DCT) and quantization are performed independently on each sub-block, e.g., each 4×4 block, included in each macroblock. In other words, each sub-block is independently Discrete Cosine Transformed and quantized regardless of correlation with its neighboring blocks, causing a loss in the original video data, and creating blocking artifacts in reconstructed video data.

A deblocking filter smoothes a block boundary error generated in block-based coding, thereby improving the quality of reconstructed video data, as will be described in detail with reference to FIGS. 1A, 1B, and 2.

Figure 1A:
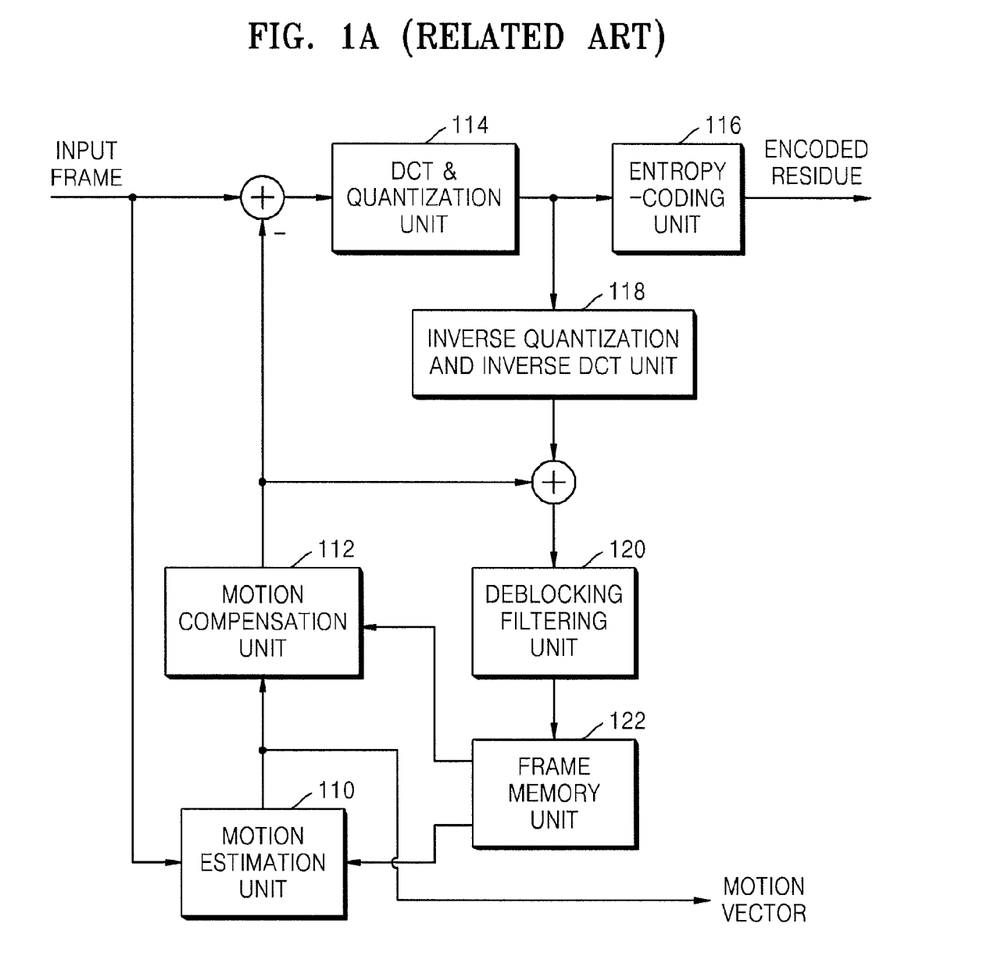
FIG. 1A is a block diagram of a video encoder according to a related art.
Figure 1B:
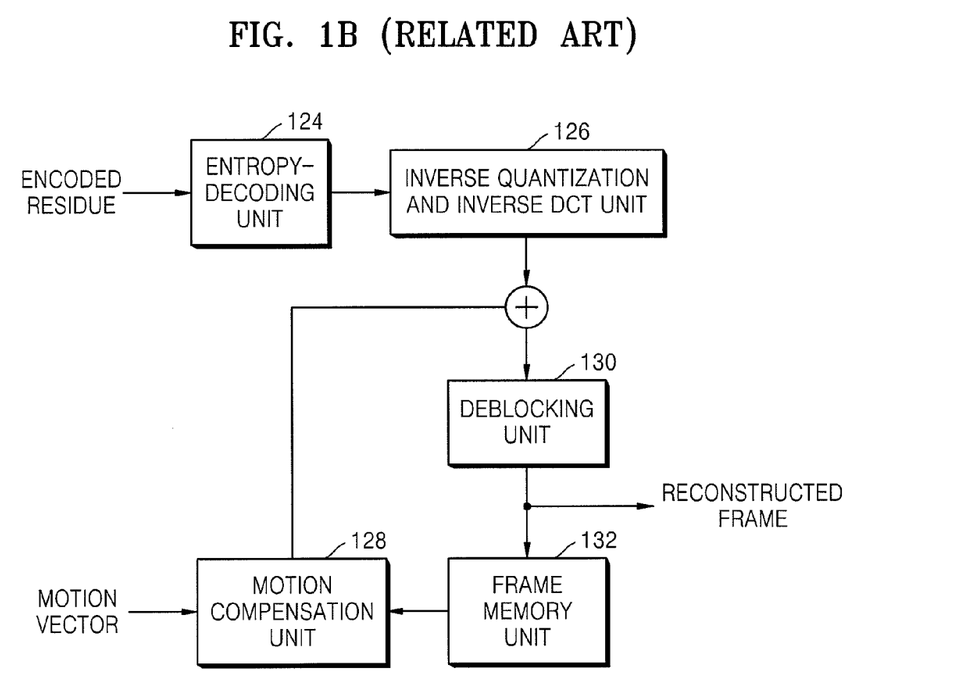
FIG. 1B is a block diagram of a video decoder according to the related art.

FIG. 1A is a block diagram of a video encoder according to a related art and FIG. 1B is a block diagram of a video decoder according to the related art. The video encoder illustrated in FIG. 1A performs video encoding through interprediction according to the H.264 standard and the video decoder illustrated in FIG. 1B decodes the interpredicted video data.

Referring to FIG. 1A, a motion estimation unit 110 generates a motion vector of the current block to be encoded by referring to at least one reference picture stored in a frame memory unit 122. A motion compensation unit 112 generates a prediction block of the current block based on the motion vector generated by the motion estimation unit 110.

The generated prediction block is subtracted from the original current block, thereby generating a residue. A DCT and quantization unit 114 performs DCT and quantization on the generated residue. An entropy-coding unit 116 performs entropy-coding on the quantized residue. The coded residue, together with the motion vector, is inserted into a bitstream for transmission to a decoding side.

The residue quantized by the DCT and quantization unit 114 is inversely quantized and inversely DCTed by an inverse quantization and inverse DCT unit 118 in order to be used in prediction of the next picture to be coded.

The reconstructed residue is added to the prediction block and the addition result is stored in the frame memory unit 122. The addition result is deblocking-filtered by a deblocking filtering unit 120 before being stored in the frame memory unit 122 because the blocking artifacts may occur if the addition result is stored in the frame memory unit 122 without being processed. The deblocking filtering according to the related art will be described later in detail with reference to FIG. 2.

FIG. 1B is a block diagram of a video decoder for decoding a block that is interprediction-encoded by the video encoder illustrated in FIG. 1A.

Referring to FIG. 1B, a motion compensation unit 128 searches a reference picture stored in a frame memory unit 132 based on data about a motion vector included in a bitstream, thereby generating a prediction block of the current block.

An entropy-decoding unit 124 receives an encoded residue and performs entropy-decoding on the received residue. The entropy-decoded residue is inversely quantized and inversely DCTed by an inverse quantization and inverse DCT unit 126. The residue reconstructed by inverse quantization and inverse DCT is added to the prediction block generated by the motion compensation unit 128, thereby being reconstructed to the original block before encoding. Like in encoding, if the reconstructed block is stored in the frame memory unit 132 without being processed, the blocking artifacts may occur. For this reason, the reconstructed block is stored in the frame memory unit 132 after being deblocking-filtered by a deblocking filtering unit 130.

Figure 2:
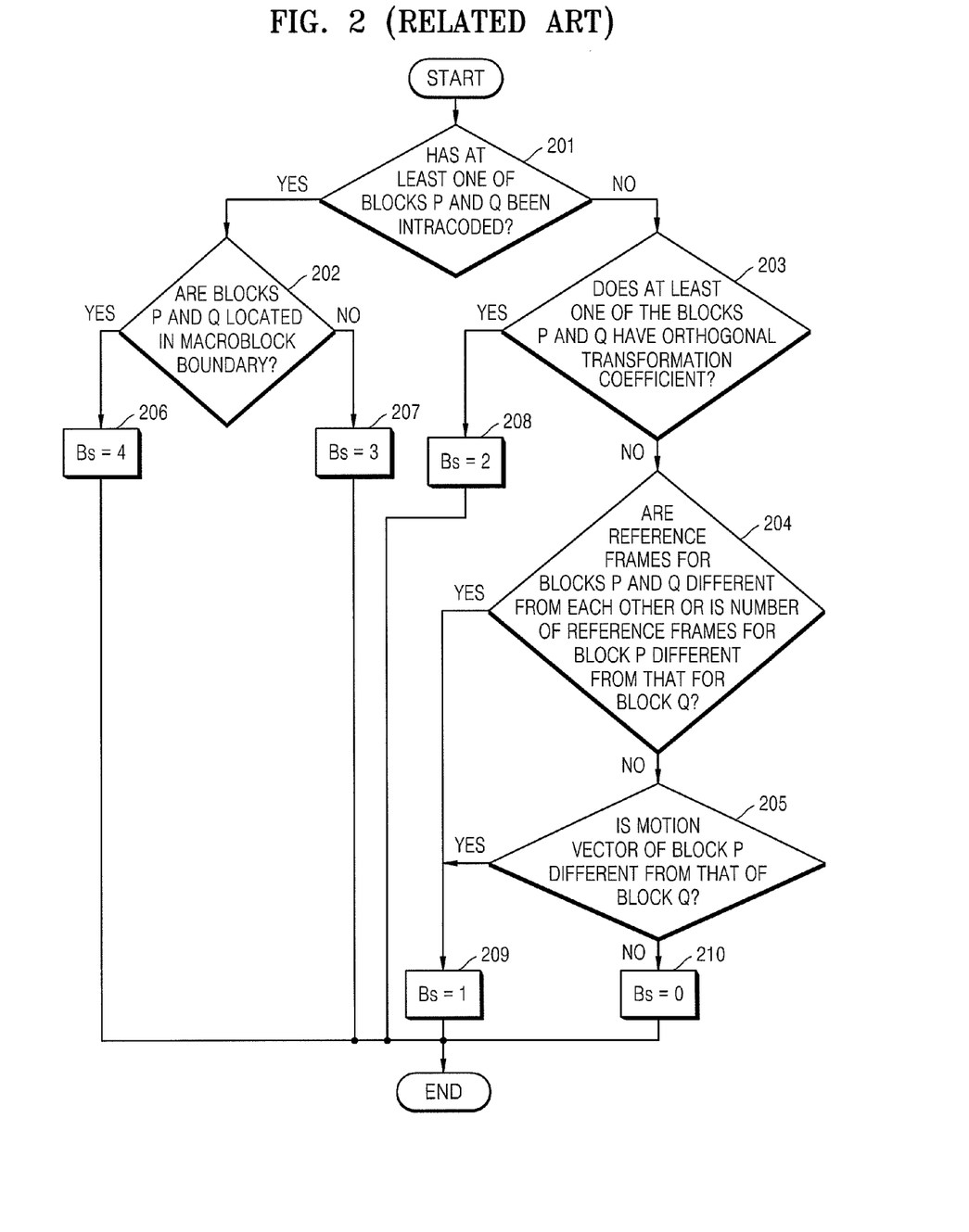
FIG. 2 is a flowchart of a deblocking filtering method according to the related art.

FIG. 2 is a flowchart of a deblocking filtering method according to the related art. In FIG. 2, the deblocking filtering unit 120 or 130 performs deblocking filtering according to the H.264 standard.

Referring to FIG. 2, the deblocking filtering unit 120 or 130 determines whether at least one of two adjacent blocks, p and q to be deblocking-filtered, has been intracoded in operation 201.

If so, the deblocking filtering unit 120 or 130 determines whether the blocks, p and q to be deblocking-filtered, are located in a macroblock boundary in operation 202. If so, the deblocking filtering unit 120 or 130 performs deblocking filtering after setting its filtering strength Bs to 4 in operation 206. If the blocks, p and q to be deblocking-filtered, are not located in the macroblock boundary, the deblocking filtering unit 120 or 130 performs deblocking filtering after setting its filtering strength Bs to 3 in operation 207.

If neither the block p nor the block q has been intracoded, the deblocking filtering unit 120 or 130 determines whether at least one of the block p and the block q has an orthogonal transformation coefficient, i.e., a DCT coefficient in operation 203. If so, the deblocking filtering unit 120 or 130 performs deblocking filtering after setting its filtering strength Bs to 2 in operation 208. If neither the block p nor the block q has an orthogonal transformation coefficient, the deblocking filtering unit 120 or 130 goes to operation 204.

If neither the block p nor the block q has an orthogonal transformation coefficient in operation 203, the deblocking filtering unit 120 or 130 determines whether reference frames for the blocks p and q are different from each other or the number of reference frames for the block p is different from that for the block q in operation 204. If so, the deblocking filtering unit 120 or 130 performs deblocking filtering after setting its filtering strength Bs to 1 in operation 209.

If reference frames for the block p and the block q are the same as each other and the number of reference frames for the block p is the same as that for the block q in operation 204, the deblocking filtering unit 120 or 130 determines whether a motion vector of the block p is different from that of the block q in operation 205. If so, the deblocking filtering unit 120 or 130 performs deblocking filtering after setting it filtering strength to a Bs of 1 in operation 209. If the motion vector of the block p is not different from that of the block q in operation 205, the deblocking filtering unit 120 or 130 sets it filtering strength to a Bs of 0 and thus does not perform deblocking filtering in operation 210.

As set forth regarding operations 201 through 210, the deblocking filtering method according to the prior art does not consider the case where the two adjacent blocks p and q have been encoded using illumination compensation. A discrete cosine (DC) value of the current block differs according to whether the current block has been encoded using illumination compensation or without using illumination compensation, and causes blocking artifacts, but the conventional deblocking filtering methods do not consider whether encoding has been performed using illumination compensation Therefore, there is a need for a method and apparatus for deblocking filtering video data by considering the case where the video data has been encoded using illumination compensation.

SUMMARY OF THE INVENTION

The present invention provides a method and apparatus for deblocking filtering video data and a computer-readable recording medium having recorded thereon a program for executing the method.

According to one aspect of the present invention, there is provided a method of filtering video data. The method includes determining whether a difference value of illumination change (DVIC) of a current image processing unit containing a current block is different from a difference value of illumination change (DVIC) of a neighboring image processing unit that is adjacent to the current image processing unit and based on the determining, adjusting a filtering strength of a deblocking filter and performing deblocking filtering on a boundary of the current block, thereby preventing blocking artifacts that may occur when an image processing unit is encoded using illumination compensation.

The determining may include evaluating an absolute value of the difference between the difference value of illumination change (DVIC) of the current image processing unit and the difference value of illumination change (DVIC) of the neighboring image processing unit with a first threshold value.

The absolute value may be compared with a second threshold value that is less than the first threshold value if the absolute value is less than the first threshold value.

The determining may include setting the difference value of illumination change (DVIC) of one of the current image processing unit and the neighboring image processing unit to 0 which has been encoded without using illumination compensation, to 0 and evaluating whether the difference value of illumination change (DVIC) of the current image processing unit is different from that of the neighboring image processing unit based on the setting result.

According to another aspect of the present invention, there is provided an apparatus for filtering video data, the apparatus comprising. The apparatus includes a control unit for determining whether a difference value of illumination change (DVIC) of a current image processing unit containing a current block is different from a difference value of illumination change (DVIC) of a neighboring image processing unit that is adjacent to the current image processing unit and a filtering unit for performing deblocking filtering on a boundary of the current block after adjusting its filtering strength according to the determination result.

The control unit may evaluate an absolute value of the difference between the difference value of illumination change (DVIC) of the current image processing unit and the difference value of illumination change (DVIC) of the neighboring image processing unit with a first threshold value.

The control unit may evaluate the absolute value with a second threshold value that is less than the first threshold value when the absolute value is less than the first threshold value.

The control unit may set the difference value of illumination change (DVIC) of one of the current image processing unit and the neighboring image processing unit which has been encoded without using illumination compensation, to 0, and evaluates whether the difference value of illumination change (DVIC) of the current image processing unit is different from that of the neighboring image processing unit based on the setting result.

The image processing unit may be a macroblock.

According to another aspect of the present invention, there is provided a computer-readable recording medium having recorded thereon a program for executing the method of filtering video data.

BRIEF DESCRIPTION OF THE DRAWINGS

The above and other features and advantages of the present invention will become more apparent from the following detailed description of exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

Figure 3A:
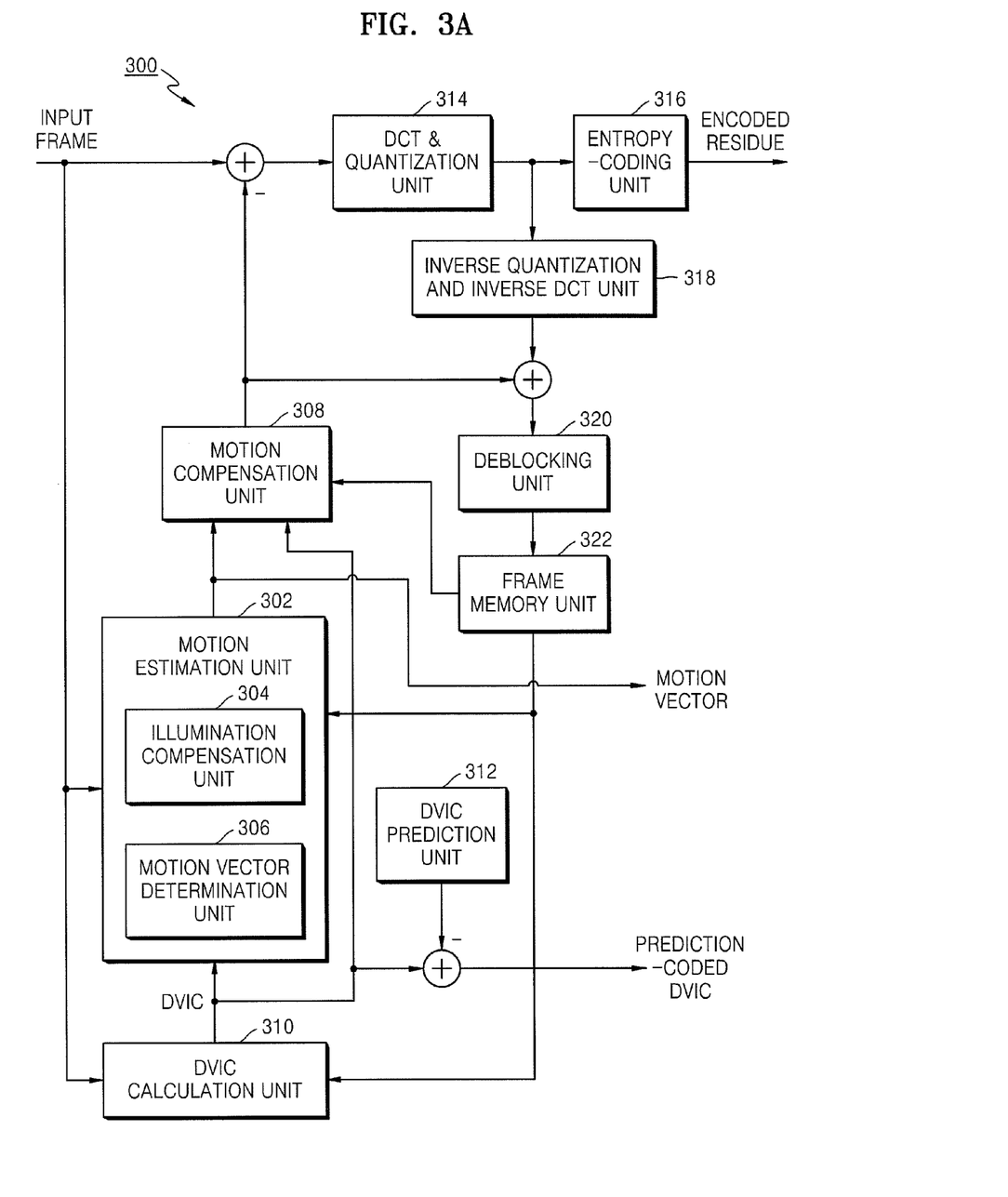
FIG. 3A is a block diagram of a video encoder using illumination compensation according to an exemplary embodiment of the present invention.
Figure 3B:
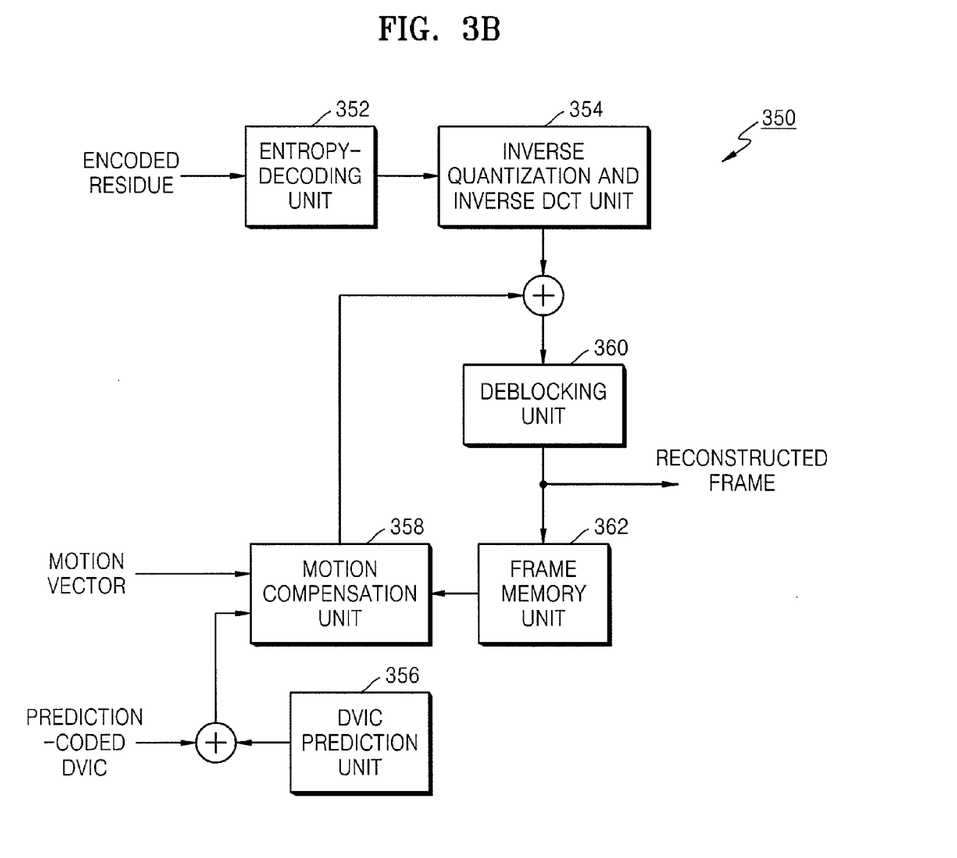
FIG. 3B is a block diagram of a video decoder using illumination compensation according to an exemplary embodiment of the present invention.

FIG. 3A is a block diagram of a video encoder 300 using illumination compensation according to an exemplary embodiment of the present invention, and FIG. 3B is a block diagram of a video decoder 350 using illumination compensation according to an exemplary embodiment of the present invention. The video encoder 300 encodes video data by performing interprediction using illumination compensation in relation to multi-view video encoding, and the video decoder 350 decodes video data interpredicted using illumination compensation in relation to multi-view video decoding.

Referring to FIG. 3A, the video encoder 300 includes a motion estimation unit 302, a motion compensation unit 308, a difference-value-of-illumination change (DVIC) calculation unit 310, a DVIC prediction unit 312, a DCT and quantization unit 314, an entropy-coding unit 316, an inverse quantization and inverse DCT unit 318, a deblocking unit 320, and a frame memory unit 322. The deblocking unit 320 serves as an apparatus for deblocking filtering video data according to an exemplary embodiment of the present invention.

The DVIC calculation unit 310 calculates a DVIC by obtaining a difference value between a discrete cosine (DC) value of the current macroblock containing the current block to be encoded and a DC value of a macroblock containing a reference block to be used for interprediction of the current block. Here, a macroblock is an example of the unit of image processing and the following description will be made on the assumption that a macroblock is the unit of image processing. A DVIC is generated for each unit of image processing, i.e., each macroblock.

The DVIC is calculated by calculating the DC value of the current macroblock containing the current block and the DC value of the macroblock containing the reference block and calculating a difference value between the calculated DC values. A prediction DVIC predicted by the DVIC prediction unit 312 using neighboring blocks that are adjacent to the current macroblock, is subtracted from the DVIC calculated by the DVIC calculation unit 310. The subtraction result is inserted into a bitstream, thereby performing prediction encoding.

The motion estimation unit 302 estimates a motion vector of the current block based on the DVIC calculated by the DVIC calculation unit 310. To this end, the motion estimation unit 302 includes an illumination compensation unit 304 and a motion vector determination unit 306. The illumination compensation unit 304 performs illumination compensation on the current block based on the calculated DVIC and the motion vector determination unit 306 estimates a motion vector of the current block by searching a reference picture stored in the frame memory unit 322 using the illumination-compensated current block.

The motion compensation unit 308 performs motion compensation using the DC value of the current macroblock, the DC value of the macroblock containing the reference block, and the estimated motion vector, in order to generate a prediction block of the current block. Motion compensation may be performed as follows:

$$NewR(i, j) = \{f(i, j) - M_{cur}(m, n)\} - \qquad (1)$$
$$\{r(i+x', j+y') - M_{ref}(m+x', n+y')\}$$
$$= \{f(i, j) - r(i+x', j+y')\} - $$
$$\{M_{cur}(m, n) - M_{ref}(m+x', n+y')\},$$

where $NewR(i, j)$ indicates a residue at coordinates $(i, j)$, which is generated with illumination compensation, $f(i, j)$ indicates a pixel value at coordinates $(i, j)$ of the current block, $r(i+x', j+y')$ indicates a pixel value at coordinates $(i+x', j+y')$ of a reference picture, $M_{cur}(m, n)$ indicates an average value of pixel values of the current macroblock, $M_{ref}(m+x', n+y')$ indicates an average value of pixel values of a macroblock containing a reference block, and $(x', y')$ indicates a motion vector.

The DCT and quantization unit 314 orthogonally transforms the generated residue into a frequency domain and quantizes the transformed residue. The quantized residue is variable-length coded by the entropy-coding unit 316 and is then inserted into a bitstream.

The inverse quantization and inverse DCT unit 318 performs inverse quantization and then inverse DCT on the quantized residue, thereby reconstructing the original residue before coding. The reconstructed residue is added to the prediction block generated by the motion compensation unit 308, to reconstruct the original block before coding.

The reconstructed block is stored in the frame memory unit 322 in order to be used as a reference block. In order to remove the blocking artifacts, the boundary of the reconstructed block is deblocking-filtered by the deblocking unit 320 before the reconstructed block is stored. Deblocking filtering according to the related art does not consider removing the blocking artifacts that occur when the current unit of image processing and/or another unit of image processing, which is adjacent to the current unit of image processing, has been encoded using illumination compensation. Therefore, a deblocking filtering method that removes the remaining blocking artifacts is described later with reference to FIGS. 4 through 6.

FIG. 3B is a block diagram of the video decoder 350 according to an exemplary embodiment of the present invention. Referring to FIG. 3B, the video decoder 350 decodes video data that has been encoded by interprediction using illumination compensation.

Referring to FIG. 3B, the video decoder 350 includes an entropy-decoding unit 352, an inverse quantization and inverse DCT unit 354, a DVIC prediction unit 356, a motion compensation unit 358, a deblocking unit 360, and a frame memory unit 362. In FIG. 3B, the deblocking unit 360 serves as the apparatus for deblocking-filtering of video data.

The entropy-decoding unit 352 entropy-decodes data corresponding to a residue of the current block included in a bitstream. The entropy-decoded data corresponding to the residue is inversely quantized and inversely discrete cosine transformed by the inverse quantization and inverse DCT unit 354, thereby constructing the residue. The reconstructed residue is added to the prediction block generated by the motion compensation unit 358, thereby reconstructing the current block.

The motion compensation unit 358 corresponds to the motion compensation unit 308 of the video encoder 300. The motion compensation unit 358 uses a DVIC in order to generate a prediction block of the current block. A DVIC of the current block is generated by adding a DVIC predicted from neighboring blocks of the current macroblock containing the current block by the DVIC prediction unit 356, to a prediction-encoded DVIC included in the bitstream.

A macroblock containing a reference block is specified by searching a reference picture stored in the frame memory unit 362 using a motion vector included in the bitstream and the generated DVIC is added to a DC value of the specified macroblock, thereby generating a DC value of the current macroblock. A prediction block of the current block is generated using the generated DC value of the current macroblock and the reference block.

The current block reconstructed by adding the residue to the prediction block generated by the motion compensation unit 358 is stored in the frame memory unit 362 in order to be used as a reference picture. In order to remove the blocking artifacts, the reconstructed current block is stored in the frame memory unit 362 after being deblocking-filtered by the deblocking unit 360.

Figure 4:
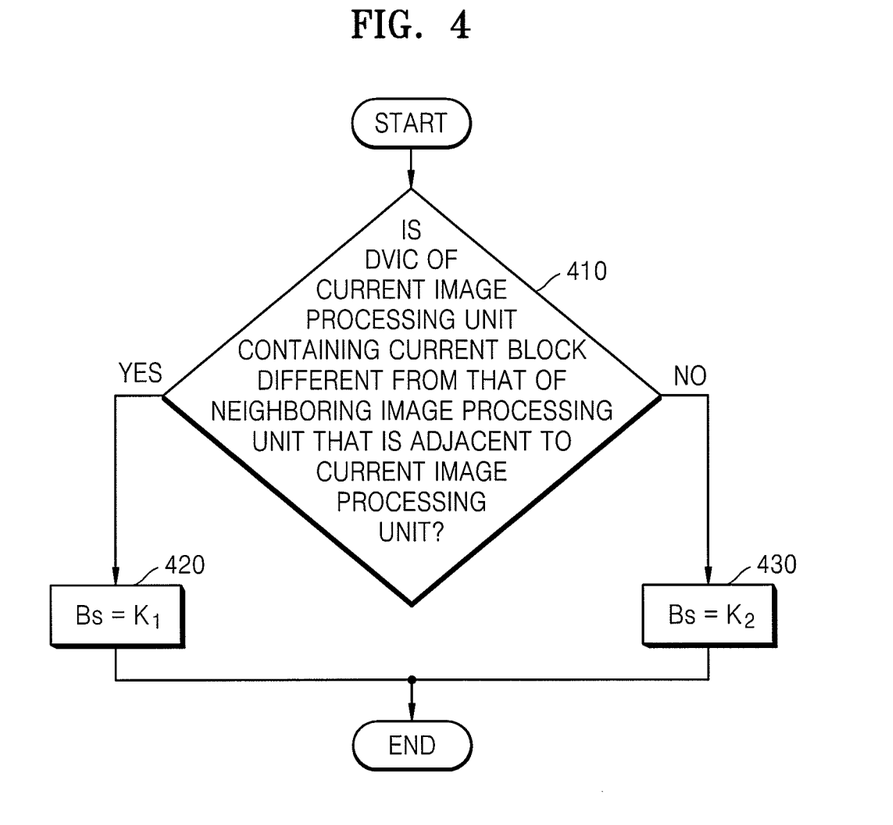
FIG. 4 is a flowchart of a method of deblocking filtering of video data according to an exemplary embodiment of the present invention.
Figure 5:
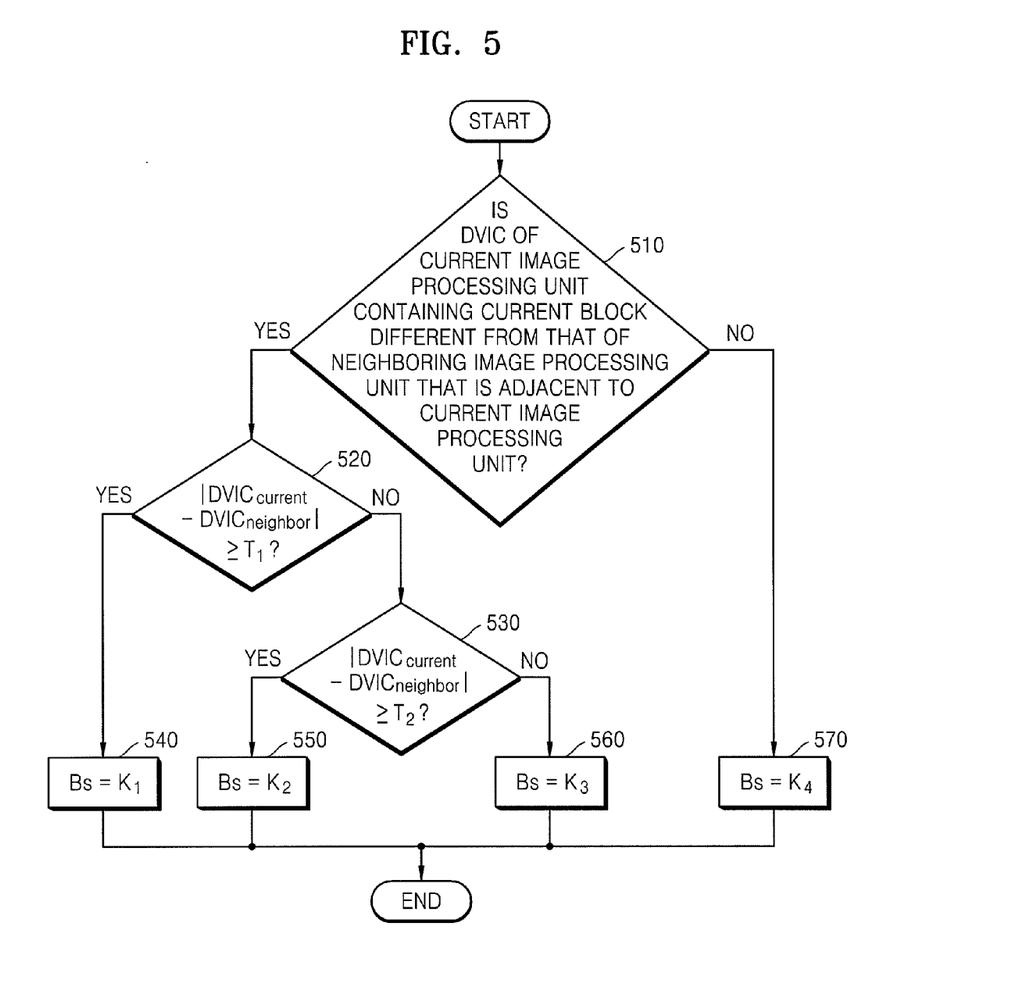
FIG. 5 is a flowchart of a method of deblocking filtering of video data according to another exemplary embodiment of the present invention.
Figure 6:
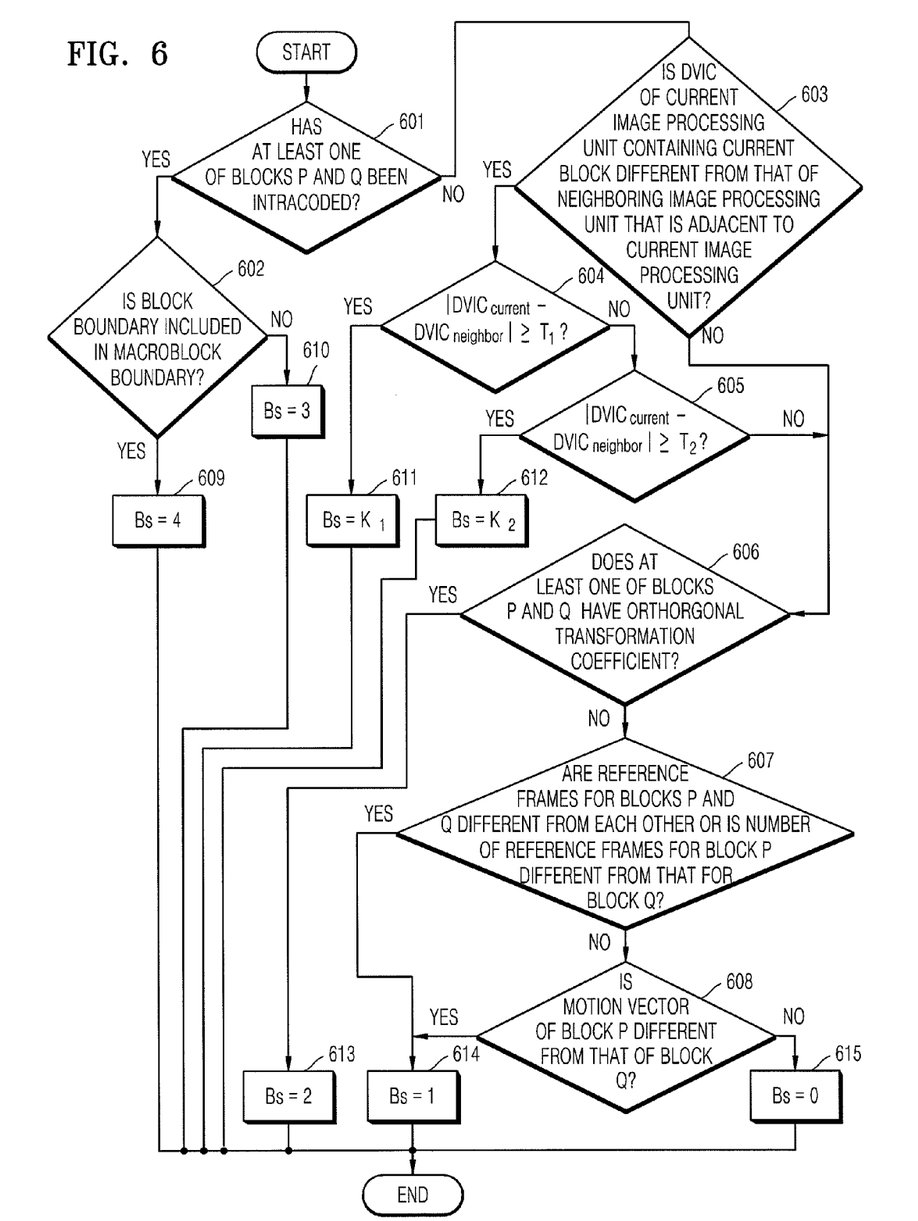
FIG. 6 is a flowchart of a method of deblocking filtering of video data according to another exemplary embodiment of the present invention.

FIGS. 4 through 6 are flowcharts for explaining a method of deblocking-filtering of video data according to exemplary embodiments of the present invention, in which the deblocking unit 320 illustrated in FIG. 3A or the deblocking unit 360 illustrated in FIG. 3B performs deblocking filtering.

FIG. 4 is a flowchart of a method of deblocking-filtering of video data according to an exemplary embodiment of the present invention. The method illustrated in FIG. 4 will be described in detail with reference to FIG. 7.

Figure 7:
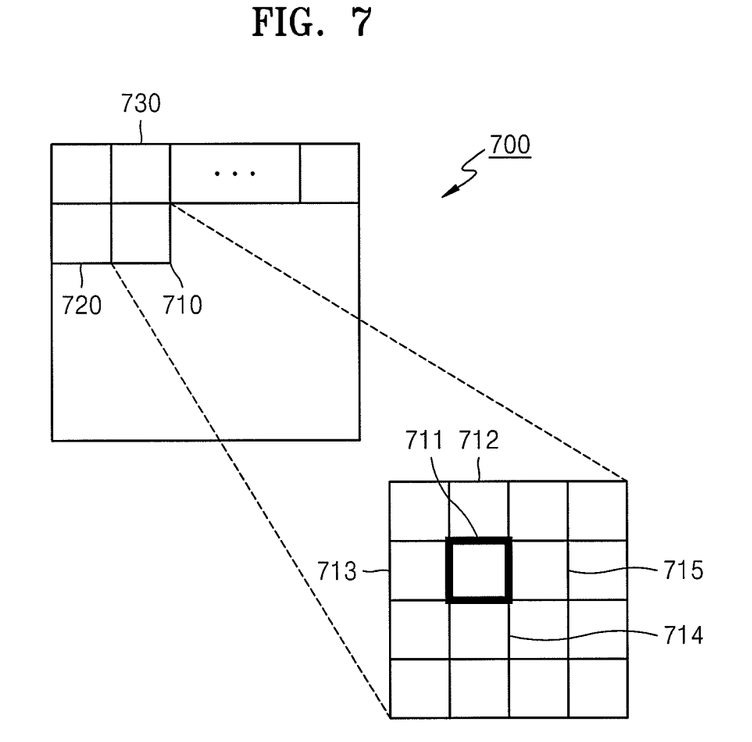
FIG. 7 illustrates a unit of image processing and the current block according to an exemplary embodiment of the present invention.

Referring to FIG. 4, the deblocking unit 320 or 360 according to an exemplary embodiment of the present invention determines whether a DVIC of a current image processing unit 710 containing a current block 711 is different from that of another image processing unit 720 or 730 that is adjacent to the current image processing unit 710 in operation 410. In the current exemplary embodiment, the current image processing unit 710 is a macroblock.

When the current image processing unit 710 and/or the neighboring image processing unit 720 or 730 have been encoded using illumination compensation, blocking artifacts may occur. However, the conventional deblocking filtering does not consider whether encoding has been performed using illumination compensation.

In operation 410, the deblocking unit 320 or 360 determines whether the DVIC of the current image processing unit 710 is different from that of the neighboring image processing unit 720 or 730.

When the DVIC of the current block 711 is compared with the DVICs of neighboring blocks 712 through 715 that are adjacent to the current block 711, it is the same as those of the neighboring blocks 712 through 715, if the current block 711 is located within the current image processing unit 710 as illustrated in FIG. 7. A DVIC is calculated for each image processing unit, i.e., each macroblock, and deblocking filtering is performed for each sub-block of the macroblock. As a result, the DVIC of the current block 711 is the same as those of the neighboring blocks 712 through 715. Therefore, DVIC comparison is performed between the current image processing unit 710 and the image processing units 720 through 730.

Preferably, when vertical boundary portions of the current block, i.e., a boundary portion between the current block 711 and a neighboring block 713 that is to the left of the current block 711, and a boundary portion between the current block 711 and a neighboring block 715 that is to the right of the current block 711, are deblocking-filtered, it is determined whether a DVIC of the current image processing unit 710 is different from that of the image processing unit 720 that is to the left of the current image processing unit 710.

When horizontal boundary portions of the current block, i.e., a boundary portion between the current block 711 and a neighboring block 712 that is above the current block 711, and a boundary portion between the current block 711 and a neighboring block 714 that is below the current block 711, are deblocking-filtered, it is determined whether a DVIC of the current image processing unit 710 is different from that of the image processing unit 730 that is above the current image processing unit 710.

If the DVIC of the current image processing unit 710 is different from that of the neighboring image processing unit 720 or 730 in operation 410, the deblocking unit 320 or 360 performs deblocking filtering on the boundary of the current block after setting its filtering strength Bs to $K_1$ in operation 420.

In contrast, if the DVIC of the current image processing unit 710 is not different from that of the neighboring image processing unit 720 or 730 in operation 410, the deblocking unit 320 or 360 performs deblocking filtering on the boundary of the current block after setting its filtering strength Bs to $K_2$ in operation 430.

In order to perform deblocking filtering with different filtering strengths according to the determination result of operation 410, $K_1$ and $K_2$ are set to different values. If the DVIC of the current image processing unit 710 is different from that of the neighboring image processing unit 720 or 730, it is desirable to increase a filtering strength. In other words, $K_1$ may be set higher than $K_2$.

One of the current image processing unit 710 and its neighboring image processing unit 720 or 730 may not have been encoded using illumination compensation. Blocking artifacts introduced by illumination compensation may also occur in a case where an image processing unit that has been encoded using illumination compensation is adjacent to an image processing unit that has been encoded without using illumination compensation. Thus, in order to perform deblocking filtering by considering this case, the deblocking unit 320 or 360 according to an exemplary embodiment of the present invention sets a DVIC of the image processing unit that has been encoded without using illumination compensation to 0 and performs the determination in operation 410.

When neither the current image processing unit 710 nor the neighboring image processing unit 720 or 730 have been encoded without using illumination compensation, their DVICs are all '0'. In this case, the deblocking unit 320 or 360 determines that the DVIC of the current image processing unit 710 is the same as that of the neighboring image processing unit 720 or 730 in operation 410, and performs deblocking filtering on the boundary of the current block 711 after setting its filtering strength Bs to $K_2$ in operation 430.

However, when one of the current image processing unit 710 and the neighboring image processing unit 720 and 730 has been encoded using illumination compensation, the DVIC of the image processing unit that has been encoded using illumination compensation is not '0' and thus the deblocking unit 320 or 360 determines that the DVIC of the current image processing unit 710 is different from that of the neighboring image processing unit 720 or 730 in operation 410. Thus, the deblocking unit 320 or 360 performs deblocking filtering on the boundary of the current block 711 after setting its filtering strength Bs to $K_1$ in operation 420.

FIG. 5 is a flowchart of a method of deblocking filtering of video data according to another exemplary embodiment of the present invention.

Operation 510 is the same as operation 410 of FIG. 4, in which the deblocking unit 320 or 360 determines whether the DVIC of the current image processing unit 710 containing the current block 711 is different from that of the image processing unit 720 or 730 that is adjacent to the current image processing unit 710.

If the DVIC of the current image processing unit 710 is different from that of the image processing unit 720 or 730 in operation 510, the deblocking unit 320 or 360 compares an absolute value of a difference between the DVIC of the current image processing unit 710 and the DVIC of the adjacent image processing unit 720 or 730 with a first threshold value $T_1$ in operation 520.

If the absolute value is less than the first threshold value $T_1$, the deblocking unit 320 or 360 compares the absolute value with a second threshold value $T_2$ in operation 530. The second threshold value $T_2$ is less than the first threshold value $T_1$. The number of threshold values that are compared with the absolute value is not limited and thus the absolute value may be compared only with the first threshold value $T_1$. In this case, if the absolute value is less than the first threshold value $T_2$, the deblocking unit 320 or 360 performs deblocking filtering after setting its filtering strength Bs to $K_3$ in operation 560.

If the absolute value is greater than the second threshold value $T_2$ in operation 530, i.e., if the absolute value is between the first threshold value $T_1$ and the second threshold value $T_2$, the deblocking unit 320 or 360 performs deblocking filtering after setting its filtering strength Bs to $K_2$ in operation 550.

For different filtering strengths in operations 540 and 550, $K_1$ and $K_2$ may be set to different values. However, in operations 560 and 570, a filtering strength may be adjusted using a conventional deblocking filtering method without assigning separate filtering strength values to $K_3$ and $K_4$, as will be described with reference to FIG. 6.

FIG. 6 is a flowchart of a method of deblocking filtering of video data according to another exemplary embodiment of the present invention, in which the method described with reference to FIG. 5 is applied to a related art deblocking filtering method.

Referring to FIG. 6, operations 603 through 605 correspond to operations 510, 520, and 530 described in FIG. 5. It is assumed that the current block 711 is a block p and the neighboring block 712, 713, 714, or 715 of the current block 711 is a block q. Hereinafter, a method of deblocking-filtering the boundary of the current block 711, i.e., a boundary between the current block 711 and its neighboring block 712, 713, 714, or 715, will be described.

Operation 601 is the same as operation 201 of FIG. 2, in which the deblocking unit 320 or 360 determines whether at least one of the two adjacent blocks p and q has been intracoded.

If so, the deblocking unit 320 or 360 determines whether the boundaries of the blocks p and q are included in a macroblock boundary in operation 602. The deblocking unit 320 or 360 performs deblocking filtering with different filtering strengths in operation 609 and 610 according to the determination result of operation 602.

If neither the block p nor the block q has been intracoded, the deblocking unit 320 or 360 determines whether the DVIC of the current image processing unit 710 containing the block p, i.e., the current block 711, is different from that of the neighboring image processing unit 720 or 730 in operation 603.

If the DVIC of the current image processing unit 710 containing the current block 711 is not different from that of the neighboring image processing unit 720 or 730, the deblocking unit 320 or 360 adjusts its filtering strength through operations 606 through 608 like in a conventional deblocking filtering method.

If the DVIC of the current image processing unit 710 containing the current block 711 is different from that of the neighboring image processing unit 720 or 730, the deblocking unit 320 or 360 compares an absolute value of a difference between the DVIC of the current image processing unit 710 and the DVIC of the neighboring image processing unit 720 or 730, with predetermined threshold values in operations 604 and 605.

If the absolute value is greater than the first threshold value $T_1$, the deblocking unit 320 or 360 performs deblocking filtering after setting its filtering strength Bs to $K_1$ in operation 611. If the absolute value is between the first threshold value $T_1$ and the second threshold value $T_2$ that is less than the first threshold value $T_1$, the deblocking unit 320 or 360 performs deblocking filtering after setting its filtering strength Bs to $K_2$ in operation 612.

If the absolute value is less than the first threshold value $T_1$ and the second threshold value $T_2$, the deblocking unit 320 or 360 adjusts its filtering strength Bs according to a conventional deblocking filtering method. In other words, the deblocking unit 320 or 360 performs the same operations as operations 203 through 205 illustrated in FIG. 2, i.e., operations 606 through 608.

A combination of the method of deblocking filtering of video data according to FIG. 5 and a conventional deblocking filtering method is illustrated in FIG. 6. However, this is only an example and various combinations thereof will be obvious to those of ordinary skill in the art.

Figure 8:
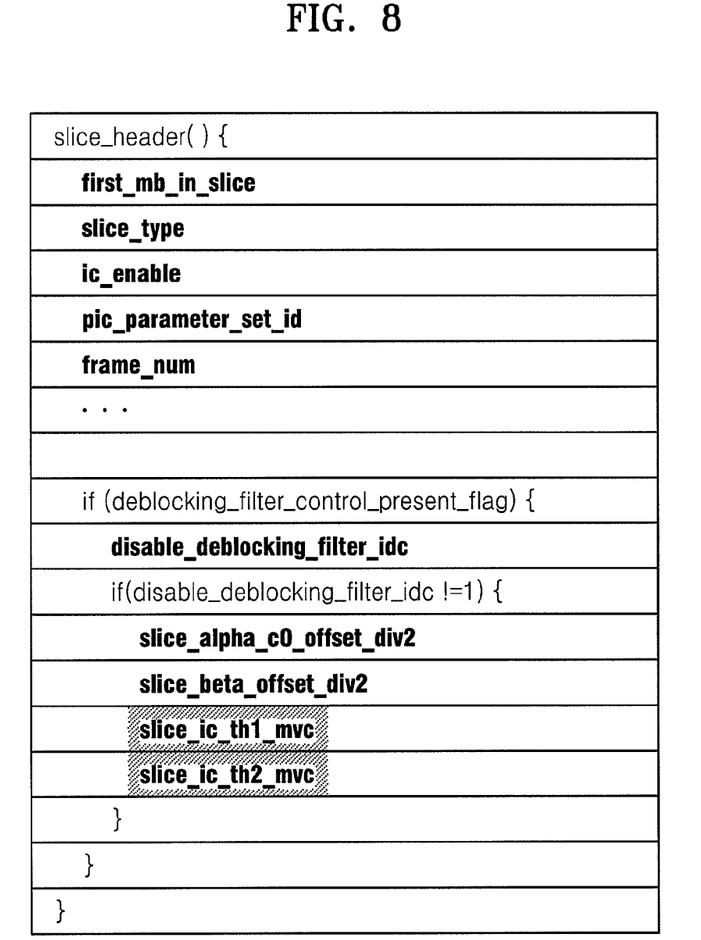
FIG. 8 illustrates the syntax of a slice header according to an exemplary embodiment of the present invention.

FIG. 8 illustrates the syntax of a slice header according to an exemplary embodiment of the present invention.

Referring to FIG. 8, a slice header according to an exemplary embodiment of the present invention includes the syntax of a first threshold value $T_1$ and/or a second threshold value $T_2$. An encoding side inserts information about the first threshold value $T_1$ and/or information about the second threshold value $T_2$ into the slice header. 'slice_ic_th1_mvc' is the information about the first threshold value $T_1$ and 'slice_ic_th2_mvc' is the information about the second threshold value $T_2$. A decoding side sets the first threshold value $T_1$ and the second threshold value $T_2$ by referring to the slice header and performs deblocking filtering on the boundary of the current block using the method for deblocking filtering of video data illustrated in FIGS. 4 through 6.

When the information about the first threshold value $T_1$ and/or the second threshold value $T_2$ is not included in the slice header, the deblocking unit 320 or 360 may perform deblocking filtering using a default threshold value. For example, the first threshold value $T_1$ may be set to '3' when the information about the first threshold value $T_1$ is not included in the slice header, and the second threshold value $T_2$ may be set to '1' when the information about the second threshold value $T_2$ is not included in the slice header.

Figure 9:
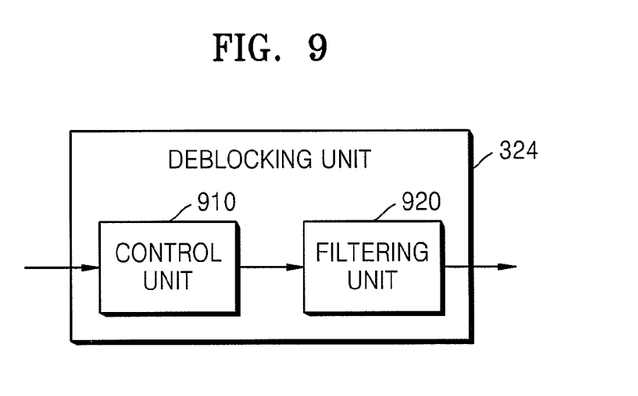
FIG. 9 is a block diagram of a deblocking unit according to an exemplary embodiment of the present invention.

FIG. 9 is a block diagram of the deblocking unit 320 or 360 according to an exemplary embodiment of the present invention.

Referring to FIG. 9, the deblocking unit 320 or 360 includes a control unit 910 and a filtering unit 920.

The control unit 910 determines whether the DVIC of the current image processing unit 710 containing the current block 711 is different from that of the neighboring image processing unit 720 or 730 of the current image processing unit 710. If so, the control unit 910 compares an absolute value of a difference between the DVICs with at least one predetermined threshold value.

When the current image processing unit 710 and/or its neighboring image processing unit 720 or 730 has not been encoded using illumination compensation, the control unit 910 sets the DVICs of the current image processing unit 710 and/or its neighboring image processing unit 720 or 730 to '0' and determines whether the DVIC of the current image processing unit 710 containing the current block 711 is different from that of the neighboring image processing unit 720 or 730.

The filtering unit 920 adjusts its filtering strength based on the determination or comparison result of the control unit 710 and performs deblocking filtering with the adjusted filtering strength.

The filtering unit 920 performs deblocking filtering on the boundary of the current block 711 by using different filtering strengths according to whether the DVIC of the current image processing unit 710 is different from that of the neighboring image processing unit 720 or 730.

The filtering unit 920 also performs deblocking filtering by using different filtering strengths according to the result of comparison between the absolute value of the difference value between the DVICs with at least one threshold value.

As described above, according to exemplary embodiments of the present invention, deblocking filtering is also performed for a case where the current image processing unit and/or its neighboring image processing unit has been encoded using illumination compensation, thereby removing blocking artifacts that may occur due to illumination compensation.

Moreover, during deblocking filtering, consideration may also be given to whether sub-blocks located within an image processing unit as well as sub-blocks located within the boundary of the image processing unit have been encoded using illumination compensation.

Meanwhile, an exemplary embodiment of the present invention can be embodied as a program stored on a medium that is readable by a computer. The computer-readable medium may include all kinds of recording devices storing data that is readable by a computer system. Examples of the computer-readable medium include read-only memory (ROM), random access memory (RAM), CD-ROMs, magnetic tapes, floppy disks, optical data storage devices, etc. The computer readable medium can also be distributed over network coupled computer systems so that the computer readable program is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method for filtering video data, the method comprising:
   determining whether a difference value of illumination change (DVIC) of a current image processing unit containing a current block is different from a DVIC of an image processing unit that is adjacent to the current image processing unit;
   adjusting a filtering strength of a deblocking filter, based on the determining; and
   performing deblocking filtering on a boundary of the current block, using the deblocking filter with the adjusted filtering strength,
   wherein the DVIC of the current image processing unit is obtained based on a value of the current image processing unit containing the current block and a value of an image processing unit containing a reference block to be used for interprediction of the current block.

2. The method of claim 1, wherein the image processing unit is a macroblock.

3. The method of claim 1, wherein the determining comprises comparing an absolute value of the difference between the DVIC of the current image processing unit and the DVIC of the neighboring image processing unit with a first threshold value.

4. The method of claim 3, wherein the performing of the deblocking filtering comprises using different filtering strengths for the deblocking filtering when the absolute value is greater than the first threshold value and when the absolute value is less than the first threshold value.

5. The method of claim 3, wherein the absolute value is compared with a second threshold value that is less than the first threshold value, if the absolute value is less than the first threshold value.

6. The method of claim 5, wherein the performing of the deblocking filtering comprises using different filtering strengths for the filtering when the absolute value is greater than the second threshold value when the absolute value is less than the second threshold value.

7. The method of claim 1, wherein the determining comprises:
   setting the DVIC of one of the current image processing unit and the adjacent image processing unit that has been encoded without using illumination compensation, to 0; and
   evaluating whether the DVIC of the current image processing unit is different from that of the adjacent image processing unit based on the setting result.

8. The method of claim 1, wherein the determining comprises evaluating whether the DVIC of the current image processing unit is different from the DVIC of the adjacent image processing unit that is to the left of the current image processing unit, and the boundary of the current block comprises a vertical boundary.

9. The method of claim 1, wherein the determining comprises evaluating whether the DVIC of the current image processing unit is different from the DVIC of the adjacent image processing unit that is above the current image processing unit, and the boundary of the current block comprises a horizontal boundary.

10. An apparatus for filtering video data, the apparatus comprising:
    a control unit that determines whether a difference value of illumination change (DVIC) of a current image processing unit containing a current block is different from a DVIC of an image processing unit that is adjacent to the current image processing unit; and
    a filtering unit that performs deblocking filtering on a boundary of the current block, after adjusting a filtering strength of the filtering unit according to the determination by the control unit,
    wherein the DVIC of the current image processing unit is obtained based on a value of the current image processing unit containing the current block and a value of an image processing unit containing a reference block to be used for interprediction of the current block.

11. The apparatus of claim 10, wherein the image processing unit is a macroblock.

12. The apparatus of claim 10, wherein the control unit compares an absolute value of the DVIC of the current image processing unit and the DVIC of the adjacent image processing unit with a first threshold value.

13. The apparatus of claim 12, wherein the filtering unit performs the deblocking filtering using different filtering strengths when the absolute value is greater than the first threshold value and when the absolute value is less than the first threshold value.

14. The apparatus of claim 12, wherein the control unit compares the absolute value with a second threshold value that is less than the first threshold value, when the absolute value is less than the first threshold value.

15. The apparatus of claim 14, wherein the filtering unit performs the deblocking filtering using different filtering strengths, when the absolute value is greater than the second threshold value and when the absolute value is less than the second threshold value.

16. The apparatus of claim 10, wherein the control unit sets the DVIC of one of the current image processing unit and the adjacent image processing unit that has been encoded without using illumination compensation, to 0, and determines whether the DVIC of the current image processing unit is different from that of the neighboring image processing unit based on the setting result.

17. The apparatus of claim 10, wherein the control unit determines whether the DVIC of the current image processing unit is different from the DVIC of the adjacent image processing unit that is to the left of the current image processing unit, and the filtering unit performs the deblocking filtering on a vertical boundary portion of the current block after adjusting the filtering strength, based on the determination result.

18. The apparatus of claim 10, wherein the control unit determines whether the DVIC of the current image processing unit is different from the DVIC of the adjacent image processing unit that is adjacent and above the current image processing unit, and the filtering unit performs the deblocking filtering on a horizontal boundary portion of the current block after adjusting its filtering strength, based on the determination result.

19. A non-transitory computer-readable recording medium having recorded thereon a program for executing a method for filtering video data, the method comprising:
   determining whether a difference value of illumination change (DVIC) of a current image processing unit containing a current block is different from a DVIC of an image processing unit that is adjacent to the current image processing unit;
   adjusting a filtering strength of a deblocking filter, based on the determining; and
   performing deblocking filtering on a boundary of the current block, using the deblocking filter with the adjusted filtering strength,
   wherein the DVIC of the current image processing unit is obtained based on a value of the current image processing unit containing the current block and a value of an image processing unit containing a reference block to be used for interprediction of the current block.

* * * * *